(12) United States Patent
Miller (10) Patent No.: US 6,983,359 B2
(45) Date of Patent: Jan. 3, 2006

(54) PROCESSOR AND METHOD FOR PRE-FETCHING OUT-OF-ORDER INSTRUCTIONS

(75) Inventor: William V. Miller, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 356 days.

(21) Appl. No.: 10/640,592

(22) Filed: Aug. 13, 2003

(65) Prior Publication Data
US 2005/0038976 A1 Feb. 17, 2005

(51) Int. Cl.
*G06F 9/38* (2006.01)
(52) U.S. Cl. ............... 712/228; 712/207; 712/233; 712/244
(58) Field of Classification Search ............ 712/207, 712/228, 233, 244
See application file for complete search history.

(56) References Cited

U.S. PATENT DOCUMENTS

| | | | |
|---|---|---|---|
| 5,463,745 A | 10/1995 | Vidwans et al. | |
| 5,701,493 A * | 12/1997 | Jaggar | 710/261 |
| 5,706,490 A | 1/1998 | Beard et al. | |
| 5,878,254 A | 3/1999 | Shimada et al. | |
| 6,161,174 A | 12/2000 | Wilhite | |
| 6,308,279 B1 | 10/2001 | Toll et al. | |
| 6,393,572 B1 | 5/2002 | Datta et al. | |
| 6,477,639 B1 | 11/2002 | Krishnan et al. | |

FOREIGN PATENT DOCUMENTS

GB 2289353 11/1995

OTHER PUBLICATIONS

Zilles et al., "The Use of Multithreading for Excerption Handling", Proceedings of the 32$^{nd}$ Annual ACM/IEEE International Symposium on Microarchitecture, ACM, 1999, pp. 219-229.*
Introduction to the ARM Architecture ARM DDI 0100E; Copyright 1996-2000 ARM Limited; pp. A1-2 to A1-9.

* cited by examiner

*Primary Examiner*—William M. Treat
(74) *Attorney, Agent, or Firm*—Thomas, Kayden, Horstemeyer & Risley (57) ABSTRACT

A processor and method for handling out-of-order instructions is provided. In one embodiment, the processor comprises instruction pre-fetch logic configured to pre-fetch instructions from memory. The processor further comprises instruction information logic configured to store information about instructions fetched from memory. The processor further comprises control logic configured to control temporary storage of the information related to a pre-fetched instruction if there is currently an active memory access and the currently pre-fetched instruction is an out-of-order instruction. The method pre-fetches the out-of-order instruction, temporarily stores information associated with the out-of-order instruction in a storage location, and if the memory access completes without encountering a data fault, then saves the temporarily stored information and processes the pre-fetched instruction.

17 Claims, 5 Drawing Sheets

PROCESSOR AND METHOD FOR PRE-FETCHING OUT-OF-ORDER INSTRUCTIONS

FIELD OF THE INVENTION

The present invention generally relates to processors, and more particularly to a processor and method for pre-fetching out-of-order instructions.

BACKGROUND

As is known, many modern computing systems and other devices utilize processors having pipelined architectures to increase instruction throughput. In theory, scalar pipelined processors can execute one instruction per machine cycle (and more in super-scalar architectures) when executing a well-ordered, sequential instruction stream. This is accomplished even though an instruction itself may implicate or require a number of separate micro-instructions to be effectuated. Pipelined processors operate by breaking up the execution of an instruction into several stages that each require one machine cycle to complete. For example, in a typical system, an instruction could require many machine cycles to complete (fetch, decode, ALU operations, etc.). Latency is reduced in pipelined processors by initiating the processing of a second instruction before the actual execution of the first instruction is completed. In the above example, in fact, multiple instructions can be in various stages of processing at any given time. Thus, the overall instruction execution latency of the system (which, in general, can be thought of as the delay between the time a sequence of instructions is initiated, and the time it is finished executing) can be significantly reduced.

The above architecture works well when program execution follows a sequential flow path. In other words, this model is premised on a sequential model of program execution, where each instruction in a program is usually the one in memory immediately following the one just executed. A critical requirement and feature of programs, however, is the ability to "branch" or re-direct program execution flow to another set of instructions. Using branch instructions conditional transfer of control can be made to some other path in the executing program different from the current one. However, this path may or may not coincide with the next immediate set of instructions following the instruction that was just executed.

Stated another way, typical prior computer processors implement in-order instruction execution pipelines. An in-order processor usually fetches an instruction stream from a memory, issues and executes each instruction in the instruction stream according to a program order. Typically, such an in-order processor determines the program order as the instructions are executed. A program counter (or instruction pointer) that specifies a next instruction in the instruction stream to be executed is continuously updated with the execution of each instruction. An instruction stream typically contains certain instructions that cause discontinuities in the program order. For example, branch (or jump) instructions, call instructions, return instructions, and interrupts may cause the processor to redirect the program counter to a discontinuous location in the memory defined by a target address. Such instructions that cause discontinuities in the program order are hereinafter referred to as out-of-order instructions.

As is known, in in-order scalar processors, it is typically desired to have one instruction executed per clock cycle. In super-scalar processors, of course, it is desired to have more than one instruction executed per clock cycle, due to the parallel-pipelined configuration of the super-scalar architecture. Although any given instruction requires more than one clock cycle to fully execute (e.g., fetch, decode, execute, etc.) an effective execution of one instruction per clock cycle can be achieved by pipelining aspects of the instruction execution (e.g., fetch, decode, execute, memory access, write back, etc.) and operating on instructions (within the pipeline) in immediate succession.

There are, however, certain exceptions to the execution of instructions in immediate succession. One such exception occurs when operating on out-of-order instructions. As mentioned above, out-of-order instructions may include branch instructions, interrupts, etc. In certain processor architectures when an out-of-order instruction follows an instruction requiring a memory access, the fetch of the out-of-order instruction is delayed until the memory access of the preceding instruction is complete. One reason for this is that the memory access of the preceding instruction may result in an error condition (such as a data fault). In such situations, some processor architectures will vector to a predefined exception-handling routine in response to the data-fault condition. In addition, the data fault usually results in the processor saving its present state (e.g., saving state to a set of status registers).

Often, the ensuing out-of-order instruction alters the state of the processor. In this regard, the out-of-order instruction may change the mode of the processor (e.g., from an application mode to a system mode), or may change whether interrupts are masked or unmasked, etc. If a processor state change occurs prior to a data fault condition occurring, then when the exception-handling routine for the data fault condition executes, it may return to an improper operating mode, causing a crash or error in the intended execution of the underline code. For this reason, prior-art processors typically delay the fetch of out-of-order instructions that follow instructions that require memory accesses. This, however, results in excessive delay and overall performance degradation, since the memory access of the preceding instruction usually completes without error (making the delay, in those instances, needless).

Therefore, there is a desire to provide an in-order execution, pipelined processor that more efficiently handles the execution of out-of-order instructions.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a processor and method for pre-fetching an out-of-order instruction. In one embodiment a processor comprises instruction pre-fetch logic configured to pre-fetch instructions from memory. The processor further comprises instruction information logic configured to store information about instructions fetched from memory. The processor further comprises control logic configured to control temporary storage of the information related to a pre-fetched instruction if there is currently an active memory access and the currently pre-fetched instruction is an out-of-order instruction.

In accordance with another embodiment of the invention a method for pre-fetching an out-of-order instruction is provided. In circumstances in which the out-of-order instruction follows an instruction involving a memory access then performing the following, the method pre-fetches the out-of-order instruction, temporarily stores status information associated with the out-of-order instruction in a storage location, and if the memory access completes without encountering a data fault, then updates the processor state with the temporarily stored status information and processes the pre-fetched instruction.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Before specifically referencing the drawings, it is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Figure 1:
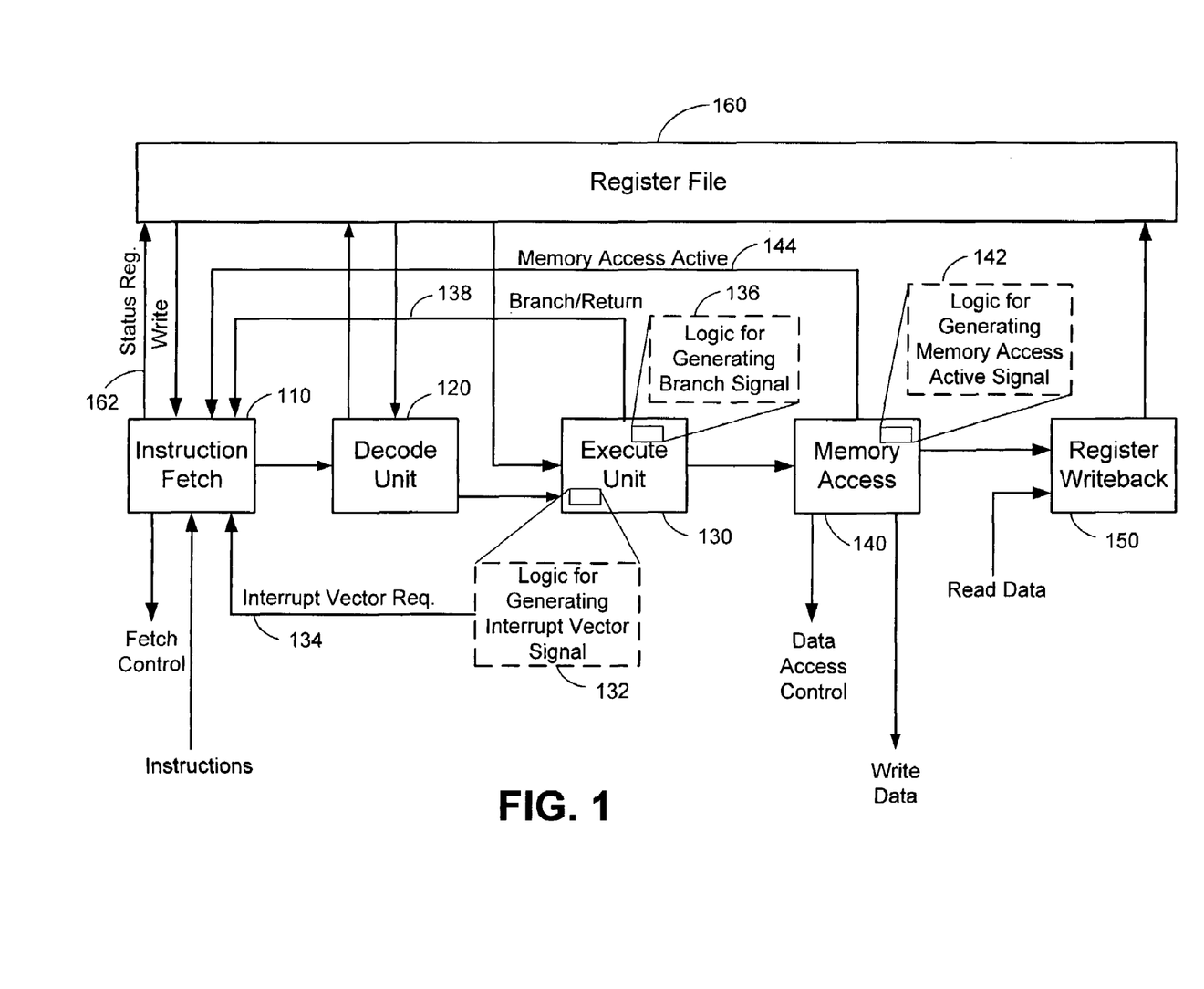
FIG. 1 is a block diagram of a five-stage pipeline-processor architecture.

Referring to FIG. 1, a block diagram depicts a five stage pipeline processor architecture for executing instructions. Alternative pipeline architectures, having more or fewer pipeline stages, may be implemented consistent with concepts and teachings of the present invention. In the architecture of FIG. 1, illustrated are an instruction fetch unit 110, a decode unit 120, an execute unit 130, a memory access unit 140, and a register writeback unit 150. Except as otherwise described herein, the operation of these units (or logic blocks) is conventional, known by persons skilled in the art, and need not be further described herein.

As is known, an instruction fetch unit 110 performs instruction memory fetches. This unit is configured to determine the value or contents of a program counter (within the register file 160) for in-order instruction execution, as well as exception vectors, branches, and returns. The instruction fetch unit 110 is also configured to determine the return address for all exceptions and branch instructions, and write or store that return address into an appropriate register within the register file 160. Consistent with the invention, addressing of instruction fetches may be through physical addresses directly to memory, or through an instruction cache (not shown) using physical or virtual addresses. Although the internal architecture of the register file 160 is not shown, the register file 160 includes various registers utilized by the processor. As is known, such registers may include general-purpose registers or special-purpose registers (such as status registers, a program counter, etc.). Further, the registers within the register file 160 may be banked or unbanked. As is known, an unbanked register refers to a single physical register that is available in all processor modes of operation. Typically, unbanked registers are completely general-purpose, having no special uses implied by the architecture. Of course, it would be up to the programmer to ensure that the contents of these registers are saved (e.g., pushed to a stack) when changing modes of operation (or when processing branch routines or other subroutines), and restored when returning from a changed mode of operation. In contrast, banked registers are separate, but essentially configured in a parallel fashion, such that only one register (within a bank) is available in a given mode of operation. A common example of bank registers includes registers available for fast interrupt exception handling. Providing a set of banked registers for this purpose avoids the need to expend the time to save and restore register state for those registers. Instead, upon the invocation of a fast interrupt handling routine, the banked registers for that mode may be immediately accessed and utilized.

The decode unit 120 operates to decode instructions passed to it from the instruction fetch unit 110 and generate the necessary control signals for the execute unit 130 to carry out the execution of the particular instruction. The specific architecture of decode units (like decode unit 120) are processor dependent, but the operation and organization of such will be understood by persons skilled in the art. Likewise, the structure and operation of the execute unit 130 are processor dependent, but will be understood by persons skilled in the art. Generally, an execute unit includes circuitry to carry out the execution of instructions as determined by the control signals generated from the decode unit 120.

As illustrated in FIG. 1, the execute unit 130 of the illustrated embodiment includes logic 132 for generating one or more interrupt vector signals 134, as well as logic 136 for generating one or more branch signals 138. As the names imply, the interrupt vector signal 134 indicates an interrupt vector condition (e.g., IRQ, FIRQ, etc.). Likewise, the branch signal 138 indicates a branch condition (or may also indicate a return from a call or interrupt vector). Indirectly, these signals indicate ensuing out-of-order instructions.

The memory access unit 140 interfaces with external data memory for reading and writing data in response to instructions executed by the execute unit 130. Of course, not all instructions require memory accesses, but for those that do, the memory access unit 140 carries out the requisite access to external memory. Consistent with the invention, such memory accesses may be direct, or may be made through a data cache using either physical or virtual addressing. The memory access unit 140 also includes logic 142 for generating a memory access active signal 144, which indicates that a memory access is currently underway. As illustrated, the interrupt vector signal 134, branch/return signal 138, and memory access active signal 144 are each directed to the instruction fetch unit 110, and are used by circuitry or logic therein for carrying out certain aspects of one embodiment of the present invention (described further below).

Finally, the register writeback unit 150 is responsible for storing or writing contents (resulting from instruction execution), where appropriate, into registers within the register file 160. For example, consider the execution of an instruction that adds the contents of two general-purpose registers and stores the contents of that addition into a third general-purpose register. After execution of such an instruction, the register writeback unit 150 causes the value obtained in the summation to be written into the third general-purpose register.

Again, it should be appreciated that the present invention, as described herein, may be implemented in a wide variety of pipelined processor architectures, and the architecture illustrated in FIG. 1 is intended to serve only as an illustrative architecture. Consequently, the illustration of FIG. 1 should not be deemed as limiting upon the architecture or environment of the present invention.

In this regard, principal features of the present invention reside within the instruction fetch unit 110. Accordingly, reference is now made to FIG. 2, which illustrates certain components that may be implemented in a fetch unit 110 of one embodiment of the present invention. As summarized above, the present invention is operative to allow pre-fetching of out-of-order instructions that follow instructions that require a memory access, while the memory access is being performed. These pre-fetched instructions, along with associated state or status information, are stored in temporary storage within the instruction fetch unit 110, while the memory access from a preceding instruction is being carried out. If the memory access results in a data fault or other exception, the pre-fetched instructions and associated information are discarded, and the system can continue operation in accordance with conventional, prior-art systems (without changing state in response to, or otherwise acting upon, the pre-fetched instructions). If, however, the memory access from the preceding instruction completes without error, then the pre-fetched instructions can be immediately forwarded to the decode unit 120 and the associated information may be communicated to the appropriate register within the register file 160.

Figure 2:
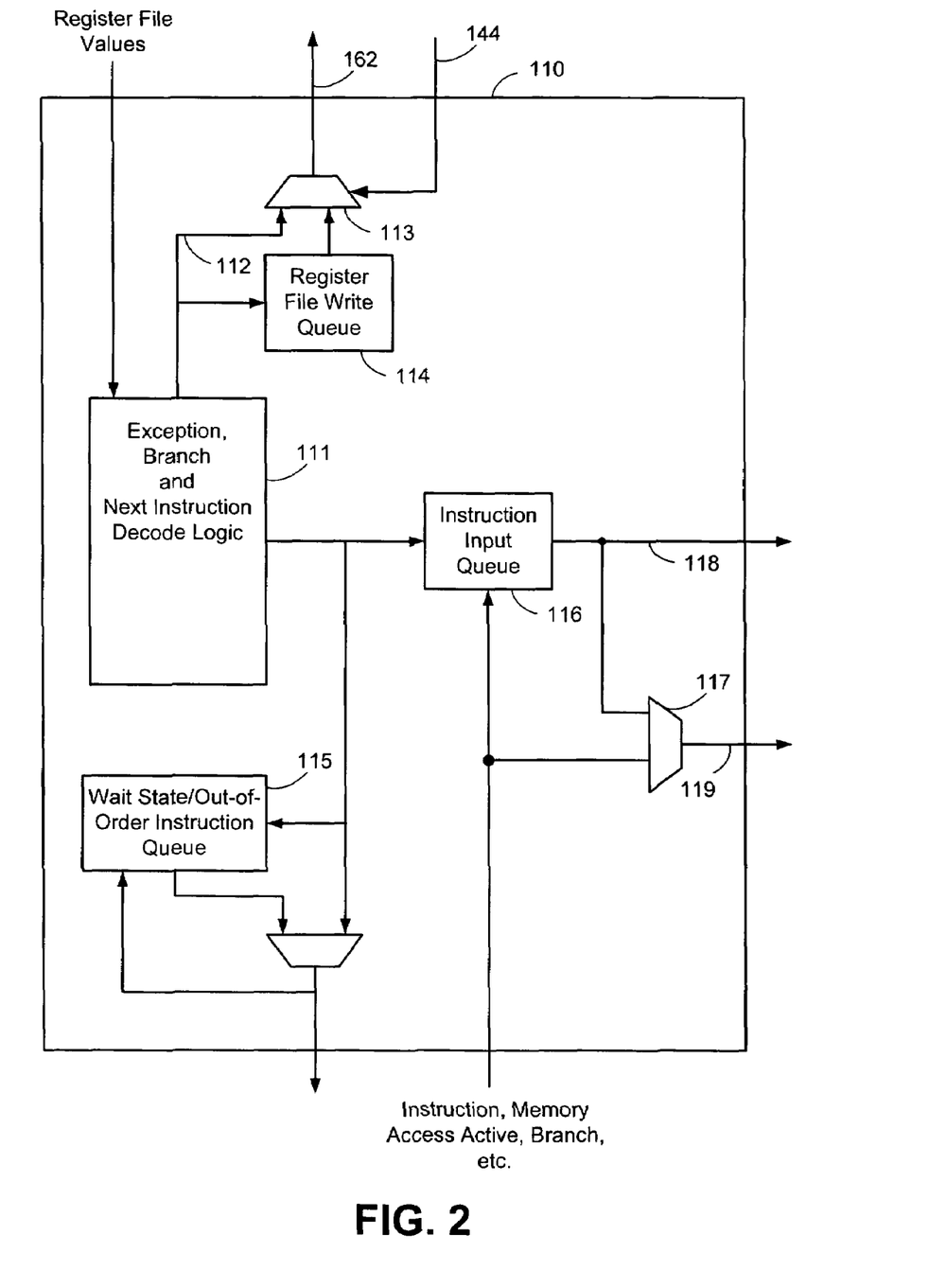
FIG. 2 is a block diagram of an instruction fetch unit constructed in accordance with one embodiment of the present invention.

Referring to FIG. 2, a diagram illustrating certain functional blocks within an instruction fetch unit 110 is illustrated. The instruction fetch unit 110 includes an exception branch and next instruction decode logic 111. This logic block performs the principal functions of the instruction fetch unit 110, in that it determines not only the location of the next instruction to be fetched, but also determines the register file unit writes. Such register file writes may be output on signal path 112. As illustrated, the output of path 112 may be directed to the register file 160 directly (via multiplexer 113 and signal path 162) or indirectly via a register file write queue 114. The register file write queue 114 provides logic to queue up register file writes when data memory accesses are still outstanding in the pipeline (e.g., when the memory access signal 144 is active). By providing this queue, the instruction fetch unit 110 can begin instruction fetches associated with an out-of-order instruction, before outstanding data memory accesses have completed. If a data abort, data fault, or other exception occurs in connection with those outstanding data memory accesses, then the register file writes that have been queued up in the queue 114 may be discarded. Consequently, the instruction fetch unit 110 of the present invention need not wait in an idle mode until outstanding memory accesses have been completed.

The instruction fetch unit 110 also includes a wait state/out-of-order instruction queue 115. This queue 115 includes logic to queue up instruction fetch requests that occur due to instruction wait states being inserted, or when an out-of-order instruction occurs and the instruction queue is not immediately usable (because outstanding instruction fetches have not yet been retired). It should be appreciated that this feature is a design implementation of one embodiment, and not a feature that is required for implementing the broader concepts of the present invention.

An instruction input queue 116 is also provided. This queue is responsible for queuing up control signals, associated with an instruction fetch, that are to be forwarded to the decode unit 120. As illustrated, this queue 116 receives inputs from both the exception branch and next instruction decode logic 111 as well as an instruction value obtained from memory (or instruction cache), along with memory feedback signals (such as the active memory access signal, interrupt request signals, branch/return signals, etc.). The program counter value of the current instruction is output on signal path 118 to the decode unit 120, and the current instruction is output on signal path 119 to the decode unit 120, as well. The associated program counter value is stored in the "Instruction Input Queue" when the instruction fetch is requested and is passed to the Decode Unit from the "Instruction Input Queue". The values placed on signal paths 118 and 119 will be appropriately operated upon by the decode unit 120.

The instruction itself may either come directly from memory or, if the processor pipeline is stalled (such as, waiting for a data memory access to complete), then the instruction may be stored in the "Instruction Input Queue" and forwarded when the memory access completes. Consequently, the Multiplexer 117 is illustrated with these two possible paths for the instruction itself 119, while the 118 path is always followed by the associated program counter value.

It should be appreciated that certain signal lines have not been specifically illustrated in the drawings in order to simplify the illustration of more meaningful aspects. For example, the FIG. 2 does not specifically illustrate the select control line of multiplexer 117. Implementation and control details such as this will be understood by persons skilled in the art, and need not be separately illustrated.

Figure 3:
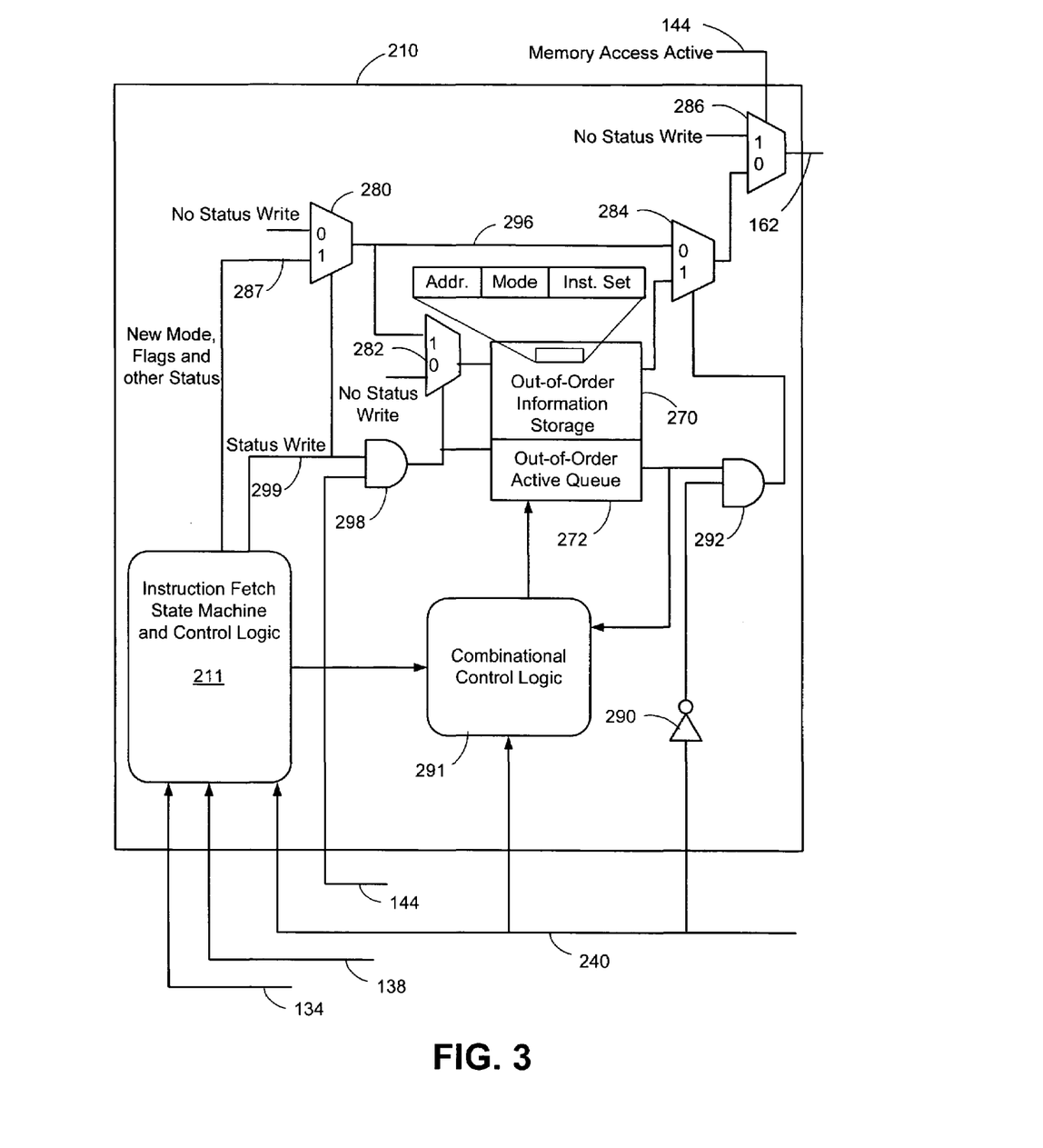
FIG. 3 is a block diagram of an instruction fetch unit constructed in accordance with one embodiment of the present invention.

Having illustrated the top-level function and structure of one embodiment of the present invention, reference is now made to FIG. 3, which is a diagram illustrating an instruction fetch unit 210 of an alternative embodiment of the present invention. For consistency with the embodiment illustrated in FIG. 1, labeling of external signal lines, such as the interrupt vector request(s) 134, branch/return 138, and memory access active 144 signal lines have been preserved. Likewise, the signal path 162 for performing register file writes has been preserved as well. Also illustrated is a signal line 240, which carries a signal indicative of a data fault or exception that may occur in connection with an outstanding memory access. Instruction fetch state machine and control logic 211 is provided for generating various control and status signals associated with a pre-fetched instruction. The outputs of this logic 211 are based, in part, upon the pre-fetched instruction, and are based in part upon the values carried on signal lines 134, 138, and 240.

An important element in the instruction fetch unit 210 of FIG. 3 is the out-of-order information storage 270. The specific information maintained in this storage area 270 may vary from embodiment to embodiment. In one embodiment, the information includes a return address that the program counter is to return to upon completion of a call or interrupt routine. This value is typically the next sequential value of the program counter, following the program counter value of a call instruction (or instruction that is being executed when an interrupt vector request is encountered). In addition, this instruction information may also include an identification of the processor state or mode (for processors that are configured to operate in more than one mode), as well as an identification of the instructions set for the current queued instruction (for processors that are configured to execute multiple instruction sets). As will be appreciated by persons skilled in the art, additional instruction information may be provided here as well.

An out-of-order flag 272 is also provided to indicate that an out-of-order instruction is currently being pre-fetched.

It should be appreciated that certain circuitry and implementation details have been omitted from the diagram of FIG. 3 for ease in illustration. Further, the circuitry and components shown need not be described in detail in order to appreciate the operation and implementation of the inventive features. For example, multiplexers 280, 282, 284, and 286 are illustrated. One of the inputs for multiplexers 280, 282, and 286 is denoted as "no status write." This designation has been made purposely generic as the actual signals provided on these inputs will vary depending upon the structure and design of the register file 160. In essence, if no changes are to be made to the register files, then inactive signal values will be placed on the corresponding bit locations of the "no status write" inputs multiplexers 280, 282, and 286. Although these multiplexers are illustrated in the diagram of FIG. 3 as having a single line on each input, it should be appreciated that the lines depicted in the drawing of FIG. 3 actually denote a plurality of physical signal lines.

By way of illustration, assume that the memory access signal 144 is currently active (logic 1), illustrating that an outstanding memory access is currently underway. This signal controls multiplexer 286 to select the no status write input, thereby ensuring that no status information is written into the register file 160. Likewise, assume that the data fault signal 240 is active (a logic 1), indicating that a data fault occurred during the course of an outstanding memory access. A logic 1 on the signal line passing through inverter 290 and the associated input of AND gate 292 will result in multiplexer 284 selecting the data on signal path 296 to be routed to multiplexer 286. The instruction fetch state machine and control logic 211 (which also receives the data fault signal 240) will control multiplexer 280 to direct the "no status write" value to the signal path 296, again ensuring that no changed state information is written to the register file 160. If, however, no data fault occurs, then the status of the out-of-order flag 272, when active, causes multiplexer 284 to select the out-of-order information from storage 270 to be directed to multiplexer 286. Upon completion of the active memory access (i.e., signal line 144 transitions from a one to a zero), then multiplexer 286 will direct this out-of-order information to the register file via signal path 162.

As is further illustrated, the information that is stored within the out-of-order information storage 270 is provided by the instruction fetch state machine and control logic 211. When the memory access signal line 144 is active (logic 1), AND gate 298 passes the value on signal line 299 to control the selection of multiplexer 282. Signal line 299 is generated by the instruction fetch state machine and control logic 211, based upon values of the interrupt vector request signals 134, the branch/return signal 138, and the data fault signal value 240. When no data fault has occurred, and in response to either an interrupt vector request or branch instruction (e.g., an out-of-order instruction indicator), the instruction fetch state machine and control logic 211 outputs a logic 1 on signal line 299, which passes through the AND gate 298 to cause multiplexer 282 to select the value on signal path 296 (output from multiplexer 280) to provide the input of the out-of-order information storage 270. This information (which is associated with the pre-fetched instruction) is also provided by the instruction fetch state machine and control logic 211, and is placed on signal path 287 (which is routed through multiplexer 280).

Again, it should be appreciated that, consistent with the scope and spirit of the present invention, based upon architectural preferences of the processor, including specific registers and the register file and other factors, the instruction fetch state machine and control logic 211 may be configured to provide a variety of instruction information to be temporarily stored in the out-of-order information storage area 270. For simplicity, FIG. 3 has been illustrated and described in a simplified form, assuming the handling of only a single out-of-order instruction. However, the instruction fetch unit 210, in one embodiment, may handle out-of-order instructions that are encountered in immediate succession. For example, upon processing a branch or return instruction, an interrupt condition may be invoked requiring two ensuing out-of-order instruction pre-fetches. In such an embodiment, the out-of-order information storage area 270 may be configured in the form of a queue that is two items deep. Further similar expansions of this circuitry may similarly be implemented.

FIG. 3 also illustrates combinational control logic 291. This element merely illustrates (collectively) the logic that is used to control the operation of the out-of-order information storage 270 and active queue 272. This logic further operates to "set" the flag of the out-of-order active queue 272 as appropriate. It should be appreciated that the actual implementation of such logic may differ from embodiment to embodiment, and no particular implementation is limiting upon the scope and spirit of the present invention.

Figure 4:
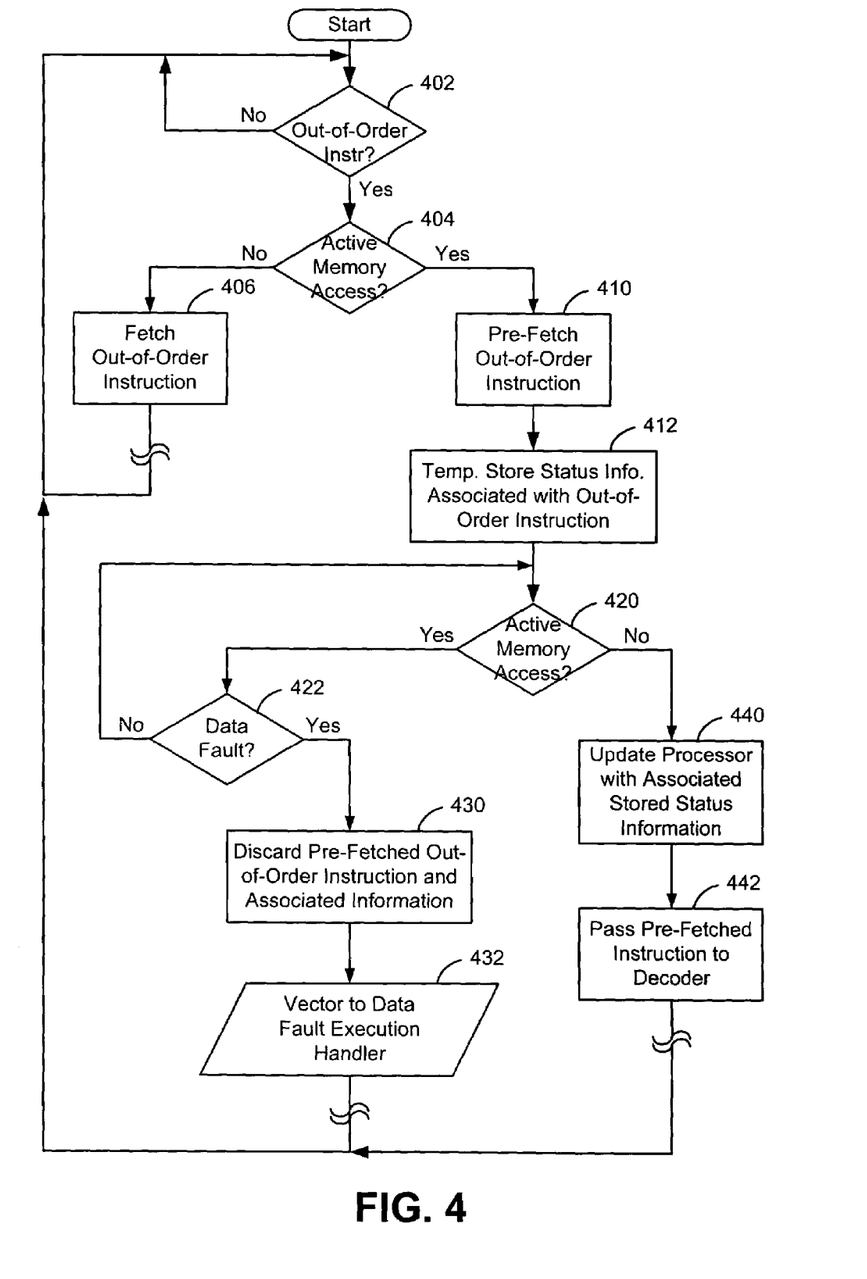
FIG. 4 is a flowchart illustrating the top-level functional operation of a method for pre-fetching out-of-order instructions in accordance with one embodiment of the present invention.

Having described certain structural components of embodiments of the present invention, reference is now made to FIG. 4, which is a flowchart illustrating the top-level functional operation of a method for pre-fetching out-of-order instructions, in accordance with one embodiment of the present invention. During normal instruction processing, the method identifies or determines the need to fetch an out-of-order instruction (step 402), such as in response to a branch instruction or an interrupt vector condition. When this occurs, the method determines whether a preceding instruction is currently involved in an active memory access (step 404). In accordance with the broader concepts of the invention, there may be a variety of ways for making this determination. If no presently-outstanding memory access is active (from a preceding instruction), then the method may fetch the invoked out-of-order instruction without delay (step 406).

If, however, a preceding instruction is currently in the midst of a memory access, then the method pre-fetches the invoked out-of-order instruction (step 410). This pre-fetched instruction is temporarily held within storage (preferably within the fetch unit). The method further identifies or generates and temporarily stores information associated with the out-of-order instruction (step 412). This associated information may include a variety of information, such as one or more of: the mode of the processor (for processors that can operate in multiple modes), an identification of the instruction set (for processors that can execute instructions of multiple instruction sets), status flags, a return address for loading into the program counter upon return from a call or interrupt service routine, as well as a variety of other information.

The method then essentially waits for the outstanding memory access (detected in step 404) to be completed (step 420). While the method is waiting for the memory access to complete, it also monitors for or detects a data fault or exception to occur in connection with the memory access (step 422). If a data fault, indeed, occurs, then the method discards any and all pre-fetched out-of-order instructions and the associated information (step 430). The method then vectors to a data-fault exception handler (step 432) to process or otherwise handle the data fault exception.

If no data fault or exception occurs, once the outstanding memory access of the preceding instruction has completed (i.e., step 420 resolves to no), then the method saves the associated information (step 440) by, for example, performing a write into the register file 160. The method further passes the pre-fetched instructions onto the decode unit 120 for decoding (step 442).

It should be appreciated that the foregoing has described various features and aspects of certain embodiments of the present invention. The invention, however, should in no way be unduly limited to the embodiments or aspects described above, as it is readily extendable and applicable to a variety of processor architectures. For example, one existing processor architecture in which the present invention could be readily implemented is known as the ARM architecture, which is a 16/32-bit embedded RISC processor. Significant information is publicly available about the structure and operation of the ARM architecture, including, for example, the ARM "Architecture Reference Manual," Second Edition, by David Seal, Addison-Wesley Publisher, 1996-2000. As is known, the ARM processor has a total of 37 registers, of which 31 are general-purpose registers, including a program counter. In addition, there are six status registers, and the processor is configured to operate in seven different operational modes. Among the registers of the ARM architecture is a current program status register and a saved program status register. The current program status register, as the name implies, contains status information pertaining to the current operating instruction. When an exception or branch is encountered, the contents of the current program status register are written into the saved program status register. Upon exiting a call or interrupt routine, in addition to the program counter being returned to the proper location for program execution, the processor may be returned to the proper state of operation by moving the contents of the saved program status register into the current program status register.

Figure 5:
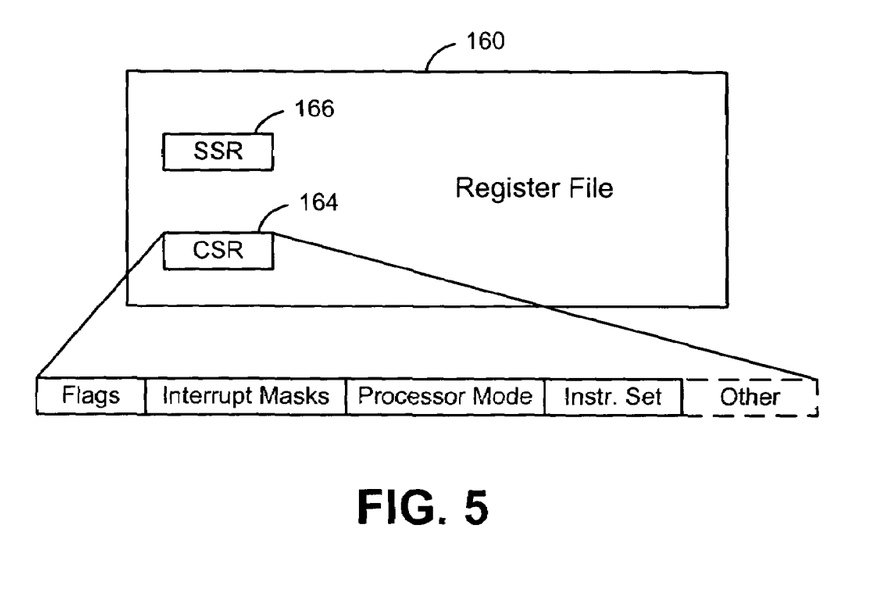
FIG. 5 is a block diagram illustrating information that may be stored within status registers of a register file in accordance with one embodiment of the present invention.

Reference is made briefly to FIG. 5, which illustrates certain contents which may be provided in similar status registers in an embodiment of the present invention. In this regard, the register file 160 may include a current status register 164 and a saved status register 166. Again, based upon the particular design and objectives of the processor architecture, a variety of information may be included within the program status registers 164 and 166. In a preferred embodiment, this information may include one or more of: a set of flags, interrupt masks, and identification of the processor mode, and an identification of the instruction set of the current operating instruction. The number of bits for each of these informational components may vary depending upon the processor architecture and design objectives.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A processor comprising:
   memory access logic configured to generate a signal indicative of an active memory access;
   instruction pre-fetch logic configured to pre-fetch instructions from memory;
   instruction information logic configured to store information about instructions fetched from memory; and
   control logic configured to control temporary storage of the information related to a pre-fetched instruction if there is currently an active memory access and the currently pre-fetched instruction is an out-of-order instruction.

2. The processor of claim 1, further including data fault logic for indicating an occurrence of a data fault in connection with the active memory access.

3. The processor of claim 1, wherein the control logic is further configured to save the temporarily stored information into a status register in response to the active memory access signal indicating that the current memory access is complete.

4. The processor of claim 2, wherein the control logic is further configured to discard the temporarily stored status information in response to the data fault logic indicating that a data fault occurred in connection with the current memory access.

5. The processor of claim 1, wherein the instruction information logic is configured to store instruction information comprising a return address.

6. The processor of claim 1, wherein the instruction information logic is configured to store instruction information comprising a processor mode.

7. The processor of claim 1, wherein the instruction information logic is configured to store instruction information comprising a instruction set identifier.

8. The processor of claim 7, wherein the instruction set identifier comprises a bit that indicates whether the currently pre-fetched instruction is a 16-bit instruction or a 32-bit instruction.

9. The processor of claim 1, wherein the instruction information logic is structured in the form of a queue having a plurality of entries, wherein each entry is configured to store information about an out-of-order instruction being fetched.

10. A method for handling an out-of-order instruction in a processor comprising:

determining whether the out-of-order instruction follows an instruction involving a memory access;

if the out-of-order instruction follows an instruction involving a memory access then performing the following:

pre-fetch the out-of-order instruction;

temporarily store information associated with the out-of-order instruction in a storage location; and if the memory access completes without encountering a data fault, then save the temporarily stored information and process the pre-fetched instruction.

11. The method of claim 10, wherein the saving the temporarily stored information more specifically comprises moving the temporarily stored information into a status register of the processor.

12. The method of claim 10, wherein the temporarily storing information more specifically comprises temporarily storing a return address.

13. The method of claim 10, wherein the temporarily storing information more specifically comprises temporarily storing an identification of a processor mode associated with the out-of-order instruction.

14. The method of claim 10, wherein the temporarily storing information more specifically comprises temporarily storing an identification of an instruction set associated with the out-of-order instruction.

15. A processor comprising:

instruction fetch control logic configured to pre-fetch an out-of-order instruction from memory;

instruction logic configured to temporarily store status information associated with the pre-fetched, out-of-order instruction, if the out-of-order instruction follows instructions requiring a memory access and the memory access is not completed at the time the out-of-order instruction is pre-fetched, the instruction information logic further configured to hold the temporarily stored status information until the memory access completes.

16. The processor of claim 15, wherein the instruction logic is further configured to discard the temporarily stored information, in response to a data fault in connection with the memory access.

17. The processor of claim 15, wherein the instruction logic if further configured to store the status information into a register of the processor in response to successful completion of the memory access.

* * * * *